(12) United States Patent
Levijoki et al.

(10) Patent No.: US 9,932,909 B1
(45) Date of Patent: Apr. 3, 2018

(54) METHOD OF ENGINE CAM CONTROL FOR CABIN HEATING

(71) Applicant: GM Global Technology Operations LLC, Detroit, MI (US)

(72) Inventors: Stephen P. Levijoki, Swartz Creek, MI (US); David N. Hayden, Ortonville, MI (US); Pulasti Bandara, Clinton Township, MI (US); Christopher E. Whitney, Commerce, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 15/439,140

(22) Filed: Feb. 22, 2017

(51) Int. Cl.
| | |
|---|---|
| *G06F 19/00* | (2018.01) |
| *F02D 13/02* | (2006.01) |
| *F02D 41/00* | (2006.01) |
| *F02D 9/02* | (2006.01) |
| *B60H 1/00* | (2006.01) |
| *B60H 1/02* | (2006.01) |

(52) U.S. Cl.
CPC ..... *F02D 13/0219* (2013.01); *B60H 1/00764* (2013.01); *B60H 1/02* (2013.01); *F02D 9/02* (2013.01); *F02D 41/0007* (2013.01); *F02D 41/0077* (2013.01); *F02D 2200/101* (2013.01); *F02D 2200/1002* (2013.01)

(58) Field of Classification Search
CPC .... F02D 13/0219; F02D 9/02; F02D 41/0077; F02D 41/0007; F02D 2200/1002; F02D 2200/101; B60H 1/02; B60H 1/00764
See application file for complete search history.

(56) References Cited

U.S. PATENT DOCUMENTS

| | | | | |
|---|---|---|---|---|
| 6,330,909 B1* | 12/2001 | Takahashi | ............. | B60H 1/005 165/202 |
| 7,614,384 B2 | 11/2009 | Livshiz et al. | | |
| 8,473,179 B2 | 6/2013 | Whitney et al. | | |
| 2010/0250039 A1* | 9/2010 | Bryan | .................... | B60K 6/365 701/22 |
| 2011/0004392 A1* | 1/2011 | Senda | ................... | F02P 5/1516 701/102 |
| 2012/0179329 A1* | 7/2012 | Okamoto | ........... | B60H 1/00735 701/36 |

* cited by examiner

Primary Examiner — Hung Q Nguyen

(57) ABSTRACT

A method of controlling intake and exhaust cam phase in an internal combustion engine for optimal HVAC performance in a motor vehicle includes requesting a cabin heating value, sensing an engine speed and an engine load of the internal combustion engine, utilizing the cabin heating value, the engine speed and the engine load in one or more lookup tables to determine intake phaser constraint values and exhaust phaser constraint values for cabin heating, and transitioning the intake phaser constraint values and the exhaust phaser constraint values for cabin heating to intake phaser constraint values and exhaust phaser constraint values based on one or more lookup tables for normal operation without a cabin heating request.

19 Claims, 3 Drawing Sheets

METHOD OF ENGINE CAM CONTROL FOR CABIN HEATING

INTRODUCTION

The present disclosure relates to cam shaft phase control. More specifically, the present disclosure relates to cam shaft phase control for optimal cabin heating.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

With the increase in engine efficiency in modern internal combustion engines, a particular drawback is the increased difficulty in providing waste heat for use in the vehicle's HVAC system, such as, for example, windshield defrost functions and passenger cabin heating.

Accordingly, as the demand for engine efficiency increases, there is a need for new and improved engine control systems and methods for optimal operation of a vehicle's HVAC system.

SUMMARY

According to several aspects, a method of controlling intake and exhaust cam phase in an internal combustion engine for optimal HVAC performance in a motor vehicle includes requesting a cabin heating value, sensing an engine speed and an engine load of the internal combustion engine, utilizing the cabin heating value, the engine speed and the engine load in one or more lookup tables to determine intake phaser constraint values and exhaust phaser constraint values for cabin heating, and transitioning the intake phaser constraint values and the exhaust phaser constraint values for cabin heating to intake phaser constraint values and exhaust phaser constraint values based on one or more lookup tables for normal operation without a cabin heating request.

In an additional aspect of the present disclosure, the lookup tables are two dimensional lookup tables.

In another aspect of the present disclosure, the one or more lookup tables for cabin heating are four lookup tables.

In another aspect of the present disclosure, the one or more lookup tables for normal operation are four lookup tables.

In another aspect of the present disclosure, the four lookup tables for cabin heating include an intake phaser minimum constraint lookup table, an intake phaser maximum constraint lookup table, an exhaust phaser minimum constraint lookup table, and an exhaust phaser maximum constraint lookup table, and wherein the four lookup tables for normal operation include an intake phaser minimum constraint lookup table, an intake phaser maximum constraint lookup table, an exhaust phaser minimum constraint lookup table, and an exhaust phaser maximum constraint lookup table for normal operation without cabin heating.

In another aspect of the present disclosure, the method further includes utilizing one or more lookup tables for a boost actuator module to control the boost of a turbocharger by controlling an opening of a waste gate to achieve a target waste gate opening area during a cabin heating operation.

In another aspect of the present disclosure, the method further includes utilizing one or more lookup tables for an Exhaust Gas Recirculation (EGR) actuator module to achieve a target EGR opening area with an EGR valve during a cabin heating operation.

In another aspect of the present disclosure, the method further includes utilizing one or more lookup tables for a throttle actuator module to adjust an opening of a throttle valve to achieve a target throttle opening area during a cabin heating operation.

In another aspect of the present disclosure, the method further includes applying one or more filters to the transitioning to moderate the transition from cabin heating operation to the normal operation.

According to several aspects, a method of optimizing HVAC performance in an internal combustion engine for a motor vehicle includes requesting a cabin heating value, sensing an engine speed and an engine load of the internal combustion engine, and utilizing the cabin heating value, the engine speed and the engine load in one or more lookup tables for at least one of the following: a phaser actuator module that controls an intake cam phaser and an exhaust cam phaser, a boost actuator module that controls the boost of a turbocharger by controlling an opening of a waste gate to achieve a target waste gate opening area, an EGR actuator module that achieves a target EGR opening area with an EGR valve, and a throttle actuator module that adjusts an opening of a throttle valve to achieve a target throttle opening area.

In an additional aspect of the present disclosure, controlling the intake cam phaser and the exhaust cam phaser includes determining intake phaser constraint values and exhaust phaser constraint values for cabin heating.

In another aspect of the present disclosure, the method further includes transitioning the intake phaser constraint values and the exhaust phaser constraint values for cabin heating to intake phaser constraint values and exhaust phaser constraint values based on one or more lookup tables for normal operation without a cabin heating request.

In another aspect of the present disclosure, the one or more lookup tables are two dimensional lookup tables.

In another aspect of the present disclosure, the one or more lookup tables for the phaser actuator module for cabin heating are four lookup tables.

In another aspect of the present disclosure, the four lookup tables for cabin heating include an intake phaser minimum constraint lookup table, an intake phaser maximum constraint lookup table, an exhaust phaser minimum constraint lookup table, and an exhaust phaser maximum constraint lookup table for cabin heating mode.

In another aspect of the present disclosure, the one or more lookup tables for normal operation are four lookup tables.

In another aspect of the present disclosure, the four lookup tables for normal operation include an intake phaser minimum constraint lookup table, an intake phaser maximum constraint lookup table, an exhaust phaser minimum constraint lookup table, and an exhaust phaser maximum constraint lookup table for normal operation.

In another aspect of the present disclosure, the method further includes applying one or more filters to the transitioning to moderate the transition from cabin heating operation to the normal operation.

According to several aspects, a method of controlling intake and exhaust cam phase in an internal combustion engine for optimal HVAC performance in a motor vehicle includes requesting a cabin heating value, sensing an engine speed and an engine load of the internal combustion engine, utilizing the cabin heating value, the engine speed and the engine load in four lookup tables to determine intake phaser constraint values and exhaust phaser constraint values for cabin heating, the four lookup tables for cabin heating including an intake phaser minimum constraint lookup table, an intake phaser maximum constraint lookup table, an exhaust phaser minimum constraint lookup table, and an exhaust phaser maximum constraint lookup table for cabin heating, and transitioning the intake phaser constraint values and the exhaust phaser constraint values for cabin heating to intake phaser constraint values and exhaust phaser constraint values based on four lookup tables for normal operation without a cabin heating request, the four lookup tables for normal operation including an intake phaser minimum constraint lookup table, an intake phaser maximum constraint lookup table, an exhaust phaser minimum constraint lookup table, and an exhaust phaser maximum constraint lookup table for normal operation.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

An engine control module (ECM) controls torque output of an engine. More specifically, the ECM controls actuators of the engine based on target values, respectively, based on a requested amount of torque. For example, the ECM controls intake and exhaust camshaft phasing based on target intake and exhaust phaser angles, a throttle valve based on a target throttle opening, an exhaust gas recirculation (EGR) valve based on a target EGR opening, and a wastegate of a turbocharger based on a target wastegate duty cycle.

Figure 1:
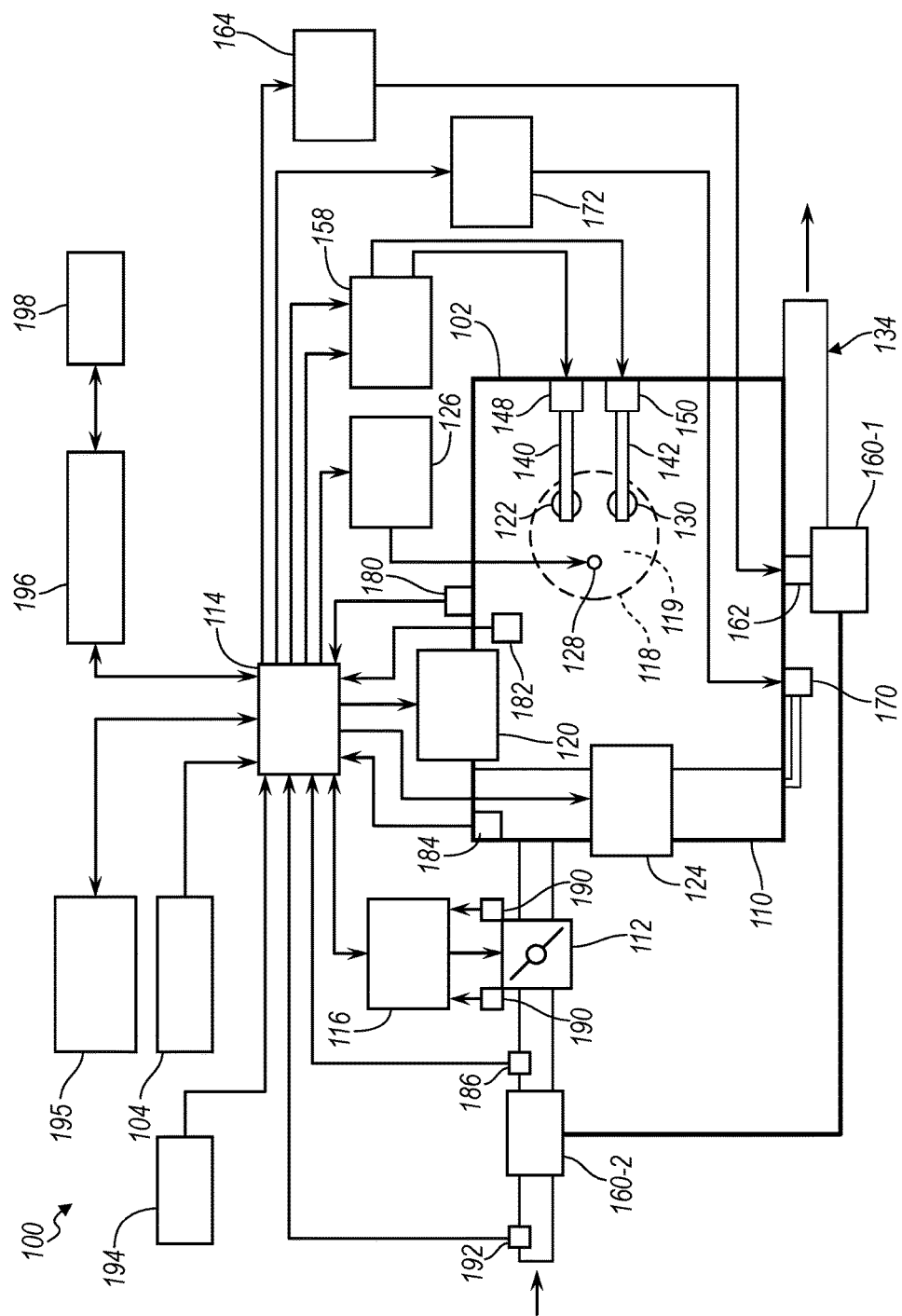
FIG. 1 is a functional block diagram of an exemplary engine control system for an internal combustion engine in accordance with the principles of the present invention.

Referring now to FIG. 1, a functional block diagram of an exemplary engine system 100 is presented. The engine system 100 includes a spark ignition internal combustion engine 102 that combusts an air/fuel mixture to produce drive torque for a vehicle based on driver input from a driver input module 104.

Air is drawn into an intake manifold 110 through a throttle valve 112 that may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example, the engine 102 may include 2, 3, 4, 5, 6, 8, 10, and/or 12 cylinders. The ECM 114 instructs a cylinder actuator module 120 to selectively deactivate some of the cylinders, which may improve fuel economy under certain engine operating conditions.

The engine 102 operates using a four-stroke cycle. The four strokes, described below, are referred to as the intake stroke, the compression stroke, the combustion stroke, and the exhaust stroke. During each revolution of a crankshaft, two of the four strokes occur within the cylinder 118. Therefore, two crankshaft revolutions are employed for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. The fuel actuator module 124 halts injection of fuel to cylinders that are deactivated.

The injected fuel mixes with air and creates an air/fuel mixture in the cylinder 118. During the compression stroke, a piston 119 within the cylinder 118 compresses the air/fuel mixture. A spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 is controlled by a timing signal specifying how far before or after TDC to generate the spark. Because piston position is directly related to crankshaft rotation, operation of the spark actuator module 126 may be synchronized with crankshaft angle. Generating spark may be referred to as a firing event. The spark actuator module 126 has the ability to vary the timing of the spark for each firing event. The spark actuator module 126 may vary the spark timing for a next firing event when the spark timing is changed between a last firing event and the next firing event. The spark actuator module 126 may halt provision of spark to deactivated cylinders.

During the combustion stroke, the combustion of the air/fuel mixture drives the piston away from TDC, thereby driving the crankshaft. The combustion stroke may be defined as the time between the piston 119 reaching TDC and the time at which the piston 119 reaches bottom dead center (BDC). During the exhaust stroke, the piston 119 begins moving away from BDC and expels the byproducts of combustion through an exhaust valve 130. The byproducts of combustion are exhausted from the vehicle via an exhaust system 134.

The intake valve 122 is controlled by an intake camshaft 140, while the exhaust valve 130 is controlled by an exhaust camshaft 142. In various implementations, multiple intake camshafts (including the intake camshaft 140) controls multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valve (including the exhaust valve 130) for multiple banks of cylinders (including the cylinder 118). In various other implementations, the intake valve 122 and/or the exhaust valve 130 is controlled by devices other than camshafts, such as camless valve actuators. The cylinder actuator module 120 may deactivate the cylinder 118 by disabling opening of the intake valve 122 and/or the exhaust valve 130.

The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 controls the intake cam phaser 148 and the exhaust cam phaser 150 based on signals from the ECM 114. When implemented, variable valve lift may also be controlled by the phaser actuator module 158.

The engine system 100 may include a turbocharger that includes a hot turbine 160-1 powered by hot exhaust gases flowing through the exhaust system 134. The turbocharger also includes a cold air compressor 160-2 that is driven by the turbine 160-1. The compressor 160-2 compresses air leading into the throttle valve 112. In various implementations, a supercharger, driven by the crankshaft, compresses air from the throttle valve 112 and delivers the compressed air to the intake manifold 110.

A wastegate 162 allows exhaust to bypass the turbine 160-1, thereby reducing the boost (the amount of intake air compression) provided by the turbocharger. A boost actuator module 164 controls the boost of the turbocharger by controlling opening of the wastegate 162. In various implementations, two or more turbochargers may be employed to control the boost actuator module 164.

An air cooler may employed to transfer heat from the compressed air charge to a cooling medium, such as engine coolant or air. An air cooler that cools the compressed air charge using engine coolant may be referred to as an intercooler. An air cooler that cools the compressed air charge using air may be referred to as a charge air cooler. The compressed air charge may receive heat, for example, via compression and/or from components of the exhaust system 134. Although shown separated for purposes of illustration, the turbine 160-1 and the compressor 160-2 may be attached to each other, placing intake air in close proximity to hot exhaust.

The engine system 100 includes an exhaust gas recirculation (EGR) valve 170, which selectively redirects exhaust gas back to the intake manifold 110. The EGR valve 170 may be located upstream of the turbocharger's turbine 160-1. The EGR valve 170 is controlled by an EGR actuator module 172 based on signals from the ECM 114.

A position of the crankshaft is measured using a crankshaft position sensor 180. A rotational speed of the crankshaft, which is also the rotational speed of the engine 102, may be determined based on the crankshaft position. A temperature of the engine coolant is measured using an engine coolant temperature (ECT) sensor 182. The ECT sensor 182 may be located within the engine 102 or at other locations where the coolant is circulated, such as a radiator.

A pressure within the intake manifold 110 is measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 is measured using a mass air flow (MAF) sensor 186. In various implementations, the MAF sensor 186 is located in a housing that also includes the throttle valve 112.

A throttle actuator module 116 monitors the position of the throttle valve 112 using one or more throttle position sensors (TPS) 190. An ambient temperature of air being drawn into the engine 102 is measured using an intake air temperature (IAT) sensor 192. The engine system 100 may also include one or more other sensors 194, such as an ambient humidity sensor, one or more knock sensors, a compressor outlet pressure sensor and/or a throttle inlet pressure sensor, a wastegate position sensor, an EGR position sensor, and/or one or more other suitable sensors. The ECM 114 employs signals from the sensors to make control decisions for the engine system 100.

The ECM 114 may communicates with a transmission control module 195 to coordinate shifting gears in a transmission. For example, the ECM 114 may reduce engine torque during a gear shift. The ECM 114 communicates with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, various functions of the ECM 114, the transmission control module 195, and the hybrid control module 196 are integrated into one or more modules.

Each system that varies an engine parameter is referred to as an engine actuator. For example, the throttle actuator module 116 may adjust opening of the throttle valve 112 to achieve a target throttle opening area. The spark actuator module 126 controls the spark plugs to achieve a target spark timing relative to piston TDC. The fuel actuator module 124 controls the fuel injectors to achieve target fueling parameters. The phaser actuator module 158 controls the intake and exhaust cam phasers 148 and 150 to achieve target intake and exhaust cam phaser angles, respectively. The EGR actuator module 172 controls the EGR valve 170 to achieve a target EGR opening area. The boost actuator module 164 controls the wastegate 162 to achieve a target wastegate opening area. The cylinder actuator module 120 controls cylinder deactivation to achieve a target number of activated or deactivated cylinders.

The ECM 114 generates the target values for the engine actuators to cause the engine 102 to generate a target engine output torque. The ECM 114 generates the target values for the engine actuators using model predictive control, as discussed further below.

Figure 2:
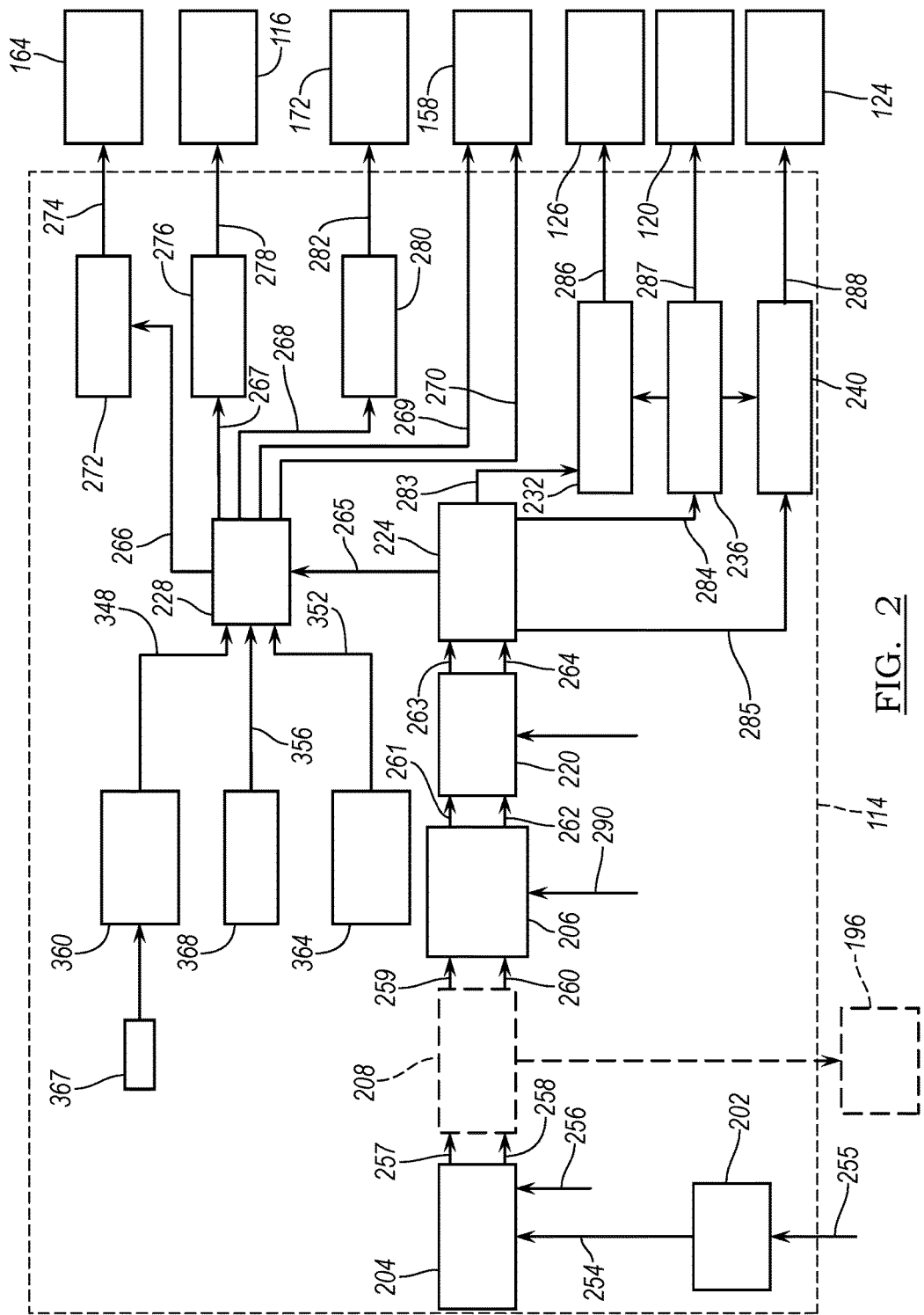
FIG. 2 is a functional block diagram of an exemplary engine control module (ECM) for the engine control system in accordance with the principles of the present invention.

Referring now to FIG. 2, a functional block diagram of an example engine control system is presented. The ECM 114 includes a driver torque module 202, an axle torque arbitration module 204, and a propulsion torque arbitration module 206. The ECM 114 may include a hybrid optimization module 208. The ECM 114 also includes a reserves/loads module 220, a torque requesting module 224, an air control module 228, a spark control module 232, a cylinder control module 236, and a fuel control module 240.

The driver torque module 202 determines a driver torque request 254 based on a driver input 255 from the driver input module 104. The driver input 255 is based on, for example, a position of an accelerator pedal and a position of a brake pedal. The driver input 255 may also be based on cruise control, which may be an adaptive cruise control system that varies vehicle speed to maintain a predetermined following distance. The driver torque module 202 may store one or more mappings of accelerator pedal position to target torque and may determine the driver torque request 254 based on a selected one of the mappings.

An axle torque arbitration module 204 arbitrates between the driver torque request 254 and other axle torque requests 256. Axle torque (torque at the wheels) may be produced by various sources including an engine and/or an electric motor. For example, the axle torque requests 256 includes a torque reduction requested by a traction control system when positive wheel slip is detected. Positive wheel slip occurs when axle torque overcomes friction between the wheels and the road surface, and the wheels begin to slip against the road surface. The axle torque requests 256 may also include a torque increase request to counteract negative wheel slip, where a tire of the vehicle slips in the other direction with respect to the road surface because the axle torque is negative.

The axle torque requests 256 may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. The axle torque requests 256 may also be generated by vehicle stability control systems.

The axle torque arbitration module 204 outputs a predicted torque request 257 and an immediate torque request 258 based on the results of arbitrating between the received torque requests 254 and 256. As described below, the predicted and immediate torque requests 257 and 258 from the axle torque arbitration module 204 may selectively be adjusted by other modules of the ECM 114 before being used to control the engine actuators.

In general terms, the immediate torque request 258 may be an amount of currently desired axle torque, while the predicted torque request 257 may be an amount of axle torque that may be needed on short notice. The ECM 114 controls the engine system 100 to produce an axle torque equal to the immediate torque request 258. However, different combinations of target values may result in the same axle torque. The ECM 114 may therefore adjust the target values to enable a faster transition to the predicted torque request 257, while still maintaining the axle torque at the immediate torque request 258.

In various implementations, the predicted torque request 257 is set based on the driver torque request 254. The immediate torque request 258 may be set to less than the predicted torque request 257 under some circumstances, such as when the driver torque request 254 is causing wheel slip on an icy surface. In such a case, a traction control system requests a reduction via the immediate torque request 258, and the ECM 114 reduces the engine torque output to the immediate torque request 258. However, the ECM 114 performs the reduction so the engine system 100 can quickly resume producing the predicted torque request 257 once the wheel slip stops.

In general terms, the difference between the immediate torque request 258 and the (generally higher) predicted torque request 257 can be referred to as a torque reserve. The torque reserve may represent the amount of additional torque (above the immediate torque request 258) that the engine system 100 can begin to produce with minimal delay. Fast engine actuators are used to increase or decrease current axle torque with minimal delay. Fast engine actuators are defined in contrast with slow engine actuators.

In general terms, fast engine actuators can change the axle torque more quickly than slow engine actuators. Slow actuators may respond more slowly to changes in their respective target values than fast actuators do. For example, a slow actuator may include mechanical components that require time to move from one position to another in response to a change in target value. A slow actuator may also be characterized by the amount of time it takes for the axle torque to begin to change once the slow actuator begins to implement the changed target value. Generally, this amount of time will be longer for slow actuators than for fast actuators. In addition, even after beginning to change, the axle torque may take longer to fully respond to a change in a slow actuator.

For example, the spark actuator module 126 is a fast actuator. Spark-ignition engines may combust fuels including, for example, gasoline and ethanol, by applying a spark. By way of contrast, the throttle actuator module 116 may be a slow actuator.

For example, as described above, the spark actuator module 126 can vary the spark timing for a next firing event when the spark timing is changed between a last firing event and the next firing event. By way of contrast, changes in throttle opening take longer to affect engine output torque. The throttle actuator module 116 changes the throttle opening by adjusting the angle of the blade of the throttle valve 112. Therefore, when the target value for opening of the throttle valve 112 is changed, there is a mechanical delay as the throttle valve 112 moves from its previous position to a new position in response to the change. In addition, air flow changes based on the throttle opening are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening to a value that would allow the engine 102 to produce the predicted torque request 257. Meanwhile, the spark timing can be set based on the immediate torque request 258, which is less than the predicted torque request 257. Although the throttle opening generates enough air flow for the engine 102 to produce the predicted torque request 257, the spark timing is retarded (which reduces torque) based on the immediate torque request 258. The engine output torque will therefore be equal to the immediate torque request 258.

When additional torque is needed, the spark timing can be set based on the predicted torque request 257 or a torque between the predicted and immediate torque requests 257 and 258. By the following firing event, the spark actuator module 126 may return the spark timing to an optimum value, which allows the engine 102 to produce the full engine output torque achievable with the air flow already present. The engine output torque may therefore be quickly increased to the predicted torque request 257 without experiencing delays from changing the throttle opening.

The axle torque arbitration module 204 outputs the predicted torque request 257 and the immediate torque request 258 to a propulsion torque arbitration module 206. In various implementations, the axle torque arbitration module 204 outputs the predicted and immediate torque requests 257 and 258 to the hybrid optimization module 208.

The hybrid optimization module 208 determines how much torque should be produced by the engine 102 and how much torque should be produced by the electric motor 198. The hybrid optimization module 208 then outputs modified predicted and immediate torque requests 259 and 260, respectively, to the propulsion torque arbitration module 206. In various implementations, the hybrid optimization module 208 is implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests 290, including the converted predicted and immediate torque requests. The propulsion torque arbitration module 206 generates an arbitrated predicted torque request 261 and an arbitrated immediate torque request 262. The arbitrated torque requests 261 and 262 may be generated by selecting a winning request from among received torque requests. Alternatively or additionally, the arbitrated torque requests may be generated by modifying one of the received requests based on another one or more of the received torque requests.

For example, the propulsion torque requests 290 includes torque reductions for engine over-speed protection, torque increases for stall prevention, and torque reductions requested by the transmission control module 195 to accommodate gear shifts. The propulsion torque requests 290 may also result from clutch fuel cutoff, which reduces the engine output torque when the driver depresses the clutch pedal in a manual transmission vehicle to prevent a flare in engine speed.

The propulsion torque requests 290 may also include an engine shutoff request, which may be initiated when a critical fault is detected. For example, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated predicted and immediate torque requests 261 and 262.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

The reserves/loads module 220 receives the arbitrated predicted and immediate torque requests 261 and 262. The reserves/loads module 220 may adjust the arbitrated predicted and immediate torque requests 261 and 262 to create a torque reserve and/or to compensate for one or more loads. The reserves/loads module 220 then outputs adjusted predicted and immediate torque requests 263 and 264 to the torque requesting module 224.

For example, a catalyst light-off process or a cold start emissions reduction process may employ retarded spark timing. The reserves/loads module 220 may therefore increase the adjusted predicted torque request 263 above the adjusted immediate torque request 264 to create retarded spark for the cold start emissions reduction process. In another example, the air/fuel ratio of the engine and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (A/C) compressor clutch. The reserve for engagement of the A/C compressor clutch may be created when the driver first requests air conditioning. The reserves/loads module 220 may increase the adjusted predicted torque request 263 while leaving the adjusted immediate torque request 264 unchanged to produce the torque reserve. Then, when the A/C compressor clutch engages, the reserves/loads module 220 may increase the adjusted immediate torque request 264 by the estimated load of the A/C compressor clutch.

The torque requesting module 224 receives the adjusted predicted and immediate torque requests 263 and 264. The torque requesting module 224 determines how the adjusted predicted and immediate torque requests 263 and 264 will be achieved. The torque requesting module 224 may be engine type specific. For example, the torque requesting module 224 may be implemented differently or use different control schemes for spark-ignition engines versus compression-ignition engines.

In various implementations, the torque requesting module 224 may define a boundary between modules that are common across all engine types and modules that are engine type specific. For example, engine types may include spark-ignition and compression-ignition. Modules prior to the torque requesting module 224, such as the propulsion torque arbitration module 206, may be common across engine types, while the torque requesting module 224 and subsequent modules may be engine type specific.

The torque requesting module 224 determines an air torque request 265 based on the adjusted predicted and immediate torque requests 263 and 264. The air torque request 265 may be a brake torque. Brake torque may refer to torque at the crankshaft under the current operating conditions.

Target values for airflow controlling engine actuators are determined based on the air torque request 265. More specifically, based on the air torque request 265, the air control module 228 determines a target wastegate opening area 266, a target throttle opening area 267, a target EGR opening area 268, a target intake cam phaser angle 269, and a target exhaust cam phaser angle 270. The air control module 228 determines the target wastegate opening area 266, the target throttle opening area 267, the target EGR opening area 268, the target intake cam phaser angle 269, and the target exhaust cam phaser angle 270 using model predictive control, as discussed further below.

The boost actuator module 164 controls the wastegate 162 to achieve the target wastegate opening area 266. For example, a first conversion module 272 may convert the target wastegate opening area 266 into a target duty cycle 274 to be applied to the wastegate 162, and the boost actuator module 164 may apply a signal to the wastegate 162 based on the target duty cycle 274. In various implementations, the first conversion module 272 converts the target wastegate opening area 266 into a target wastegate position, and converts the target wastegate position into the target duty cycle 274.

The throttle actuator module 116 controls the throttle valve 112 to achieve the target throttle opening area 267. For example, a second conversion module 276 converts the target throttle opening area 267 into a target duty cycle 278 to be applied to the throttle valve 112, and the throttle actuator module 116 applies a signal to the throttle valve 112 based on the target duty cycle 278. In various implementations, the second conversion module 276 converts the target throttle opening area 267 into a target throttle position, and converts the target throttle position into the target duty cycle 278.

The EGR actuator module 172 controls the EGR valve 170 to achieve the target EGR opening area 268. For example, a third conversion module 280 converts the target EGR opening area 268 into a target duty cycle 282 to be applied to the EGR valve 170, and the EGR actuator module 172 applies a signal to the EGR valve 170 based on the target duty cycle 282. In various implementations, the third conversion module 280 converts the target EGR opening area 268 into a target EGR position, and converts the target EGR position into the target duty cycle 282.

The phaser actuator module 158 controls the intake cam phaser 148 to achieve the target intake cam phaser angle 269. The phaser actuator module 158 also controls the exhaust cam phaser 150 to achieve the target exhaust cam phaser angle 270. In various implementations, a fourth conversion module is included to convert the target intake and exhaust cam phaser angles into target intake and exhaust duty cycles, respectively. The phaser actuator module 158 may apply the target intake and exhaust duty cycles to the intake and exhaust cam phasers 148 and 150, respectively. In various implementations, the air control module 228 determines a target overlap factor and a target effective displacement, and the phaser actuator module 158 may control the intake and exhaust cam phasers 148 and 150 to achieve the target overlap factor and the target effective displacement.

The torque requesting module 224 may also generate a spark torque request 283, a cylinder shut-off torque request 284, and a fuel torque request 285 based on the predicted and immediate torque requests 263 and 264. The spark control module 232 may determine how much to retard the spark timing (which reduces engine output torque) from an optimum spark timing based on the spark torque request 283. For example, a torque relationship may be inverted to solve for a target spark timing 286. For a given torque request ($T_{Req}$), the target spark timing ($S_T$) 286 may be determined by the relation: $S_T = f^{-1}(T_{Req}, APC, I, E, AF, OT, \#)$, where APC is an APC, I is an intake valve phasing value, E is an exhaust valve phasing value, AF is an air/fuel ratio, OT is an oil temperature, and # is a number of activated cylinders. This relationship may be embodied as an equation and/or as a lookup table. The air/fuel ratio (AF) may be the actual air/fuel ratio, as reported by the fuel control module 240.

When the spark timing is set to the optimum spark timing, the resulting torque may be as close to a maximum best torque (MBT) as possible. MBT refers to the maximum engine output torque that is generated for a given air flow as spark timing is advanced, while using fuel having an octane rating greater than a predetermined octane rating and using stoichiometric fueling. The spark timing at which this maximum torque occurs is referred to as an MBT spark timing. The optimum spark timing may differ slightly from MBT spark timing because of, for example, fuel quality (such as when lower octane fuel is used) and environmental factors, such as ambient humidity and temperature. The engine output torque at the optimum spark timing may therefore be less than MBT. For example only, a table of optimum spark timings corresponding to different engine operating conditions may be determined during a calibration phase of vehicle design, and the optimum value is determined from the table based on current engine operating conditions.

The cylinder shut-off torque request 284 may be used by the cylinder control module 236 to determine a target number of cylinders to deactivate 287. In various implementations, a target number of cylinders to activate may be used. The cylinder actuator module 120 selectively activates and deactivates the valves of cylinders based on the target number 287.

The cylinder control module 236 may also instruct the fuel control module 240 to stop providing fuel for deactivated cylinders and may instruct the spark control module 232 to stop providing spark for deactivated cylinders. The spark control module 232 may stop providing spark to a cylinder once a fuel/air mixture that is already present in the cylinder has been combusted.

The fuel control module 240 may vary the amount of fuel provided to each cylinder based on the fuel torque request 285. More specifically, the fuel control module 240 may generate target fueling parameters 288 based on the fuel torque request 285. The target fueling parameters 288 may include, for example, target mass of fuel, target injection starting timing, and target number of fuel injections.

During normal operation, the fuel control module 240 may operate in an air lead mode in which the fuel control module 240 attempts to maintain a stoichiometric air/fuel ratio by controlling fueling based on air flow. For example, the fuel control module 240 may determine a target fuel mass that will yield stoichiometric combustion when combined with a present mass of air per cylinder (APC).

Combustion phasing may refer to a crankshaft position where a predetermined amount of fuel injected is combusted within a cylinder relative to a predetermined crankshaft position for combustion of the predetermined amount of injected fuel. For example, combustion phasing may be expressed in terms of CA50 relative to a predetermined CA50. CA50 may refer to a crankshaft angle (CA) where 50 percent of a mass of injected fuel has been combusted within a cylinder. The predetermined CA50 may correspond to a CA50 where a maximum amount of work is produced from the fuel injected and may be approximately 8.5—approximately 10 degrees after TDC (top dead center) in various implementations. While combustion phasing will be discussed in terms of CA50 values, another suitable parameter indicative of combustion phasing may be used. Additionally, while combustion quality will be discussed as coefficient of variation (COV) of indicated mean effective pressure (IMEP) values, another suitable parameter indicative of combustion quality may be used.

An actuator constraint module 360 sets an actuator constraints 348 for each of the target values 266 through 270. That is, the actuator constraint module 360 sets an actuator constraint for the throttle valve 112, an actuator constraint for the EGR valve 170, an actuator constraint for the waste gate 162, an actuator constraint for the intake cam phaser 148, and an actuator constraint for the exhaust cam phaser 150.

The actuator constraints 348 for each one of the target values 266-270 includes a maximum value for an associated target value and a minimum value for that target value. The actuator constraint module 360 may generally set the actuator constraints 348 to predetermined operational ranges for the associated actuators. More specifically, the actuator constraint module 360 may generally set the actuator constraints 348 to predetermined operational ranges for the throttle valve 112, the EGR valve 170, the wastegate 162, the intake cam phaser 148, and the exhaust cam phaser 150, respectively.

In certain implementations, the actuator constraint module 360 selectively adjusts one or more of the actuator constraints 348 under some circumstances. For example, in a particular implementation, the actuator constraint module 360 adjusts the actuator constraints for a given actuator to narrow the operational range for that engine actuator when a fault is diagnosed in that engine actuator. In another implementation, the actuator constraint module 360 adjusts the actuator constraints such that the target value for a given actuator follows a predetermined schedule over time or changes by a predetermined amount, for example, for a fault diagnostic, such as a cam phaser fault diagnostic, a throttle diagnostic, an EGR diagnostic, etc. For a target value to follow a predetermined schedule over time or to change by a predetermined amount, the actuator constraint module 360 may set the minimum and maximum values to the same value. The minimum and maximum values being set to the same value may force the corresponding target value to be set to the same value as the minimum and maximum values. The actuator constraint module 360 may vary the same value to which the minimum and maximum values are set over time to cause the target value to follow a predetermined schedule.

An output constraint module 364 sets the output constraints 352 for the predicted torque output of the engine 102, the predicted CA50, the predicted COV of IMEP, the predicted residual dilution, and the predicted external dilution. The output constraints 352 for each one of the predicted values may include a maximum value for an associated predicted parameter and a minimum value for that predicted parameter. For example, the output constraints 352 may include a minimum torque, a maximum torque, a minimum CA50 and a maximum CA50, a minimum COV of IMEP and a maximum COV of IMEP, a minimum residual dilution and a maximum residual dilution, and a minimum external dilution and a maximum external dilution.

In various implementations, the output constraint module 364 generally sets the output constraints 352 to predetermined ranges for the associated predicted parameters, respectively. The output constraint module 364, however, may vary one or more of the output constraints 352 under some circumstances. For example, the output constraint module 364 may retard the maximum CA50, such as when knock occurs within the engine 102. For another example, the output constraint module 364 may increase the maximum COV of IMEP under low load conditions, such as during engine idling where a higher COV of IMEP may be employed to achieve a given torque request.

A reference module 368 generates the reference values 356 for the target values 266-270, respectively. The reference values 356 include a reference for each of the target values 266-270. In other words, the reference values 356 include a reference wastegate opening area, a reference throttle opening area, a reference EGR opening area, a reference intake cam phaser angle 269, and a reference exhaust cam phaser angle 270.

The reference module 368 may determine the reference values 356, for example, based on the air torque request 265, the base air torque request 308, and/or one or more other suitable parameters. The reference values 356 provide references for setting the target values 266-270, respectively. The reference values 356 may be used to determine the cost values for possible sequences. The reference values 356 may also be used for one or more other reasons, such as by the sequence determination module 316 to determine possible sequences.

Figure 3:
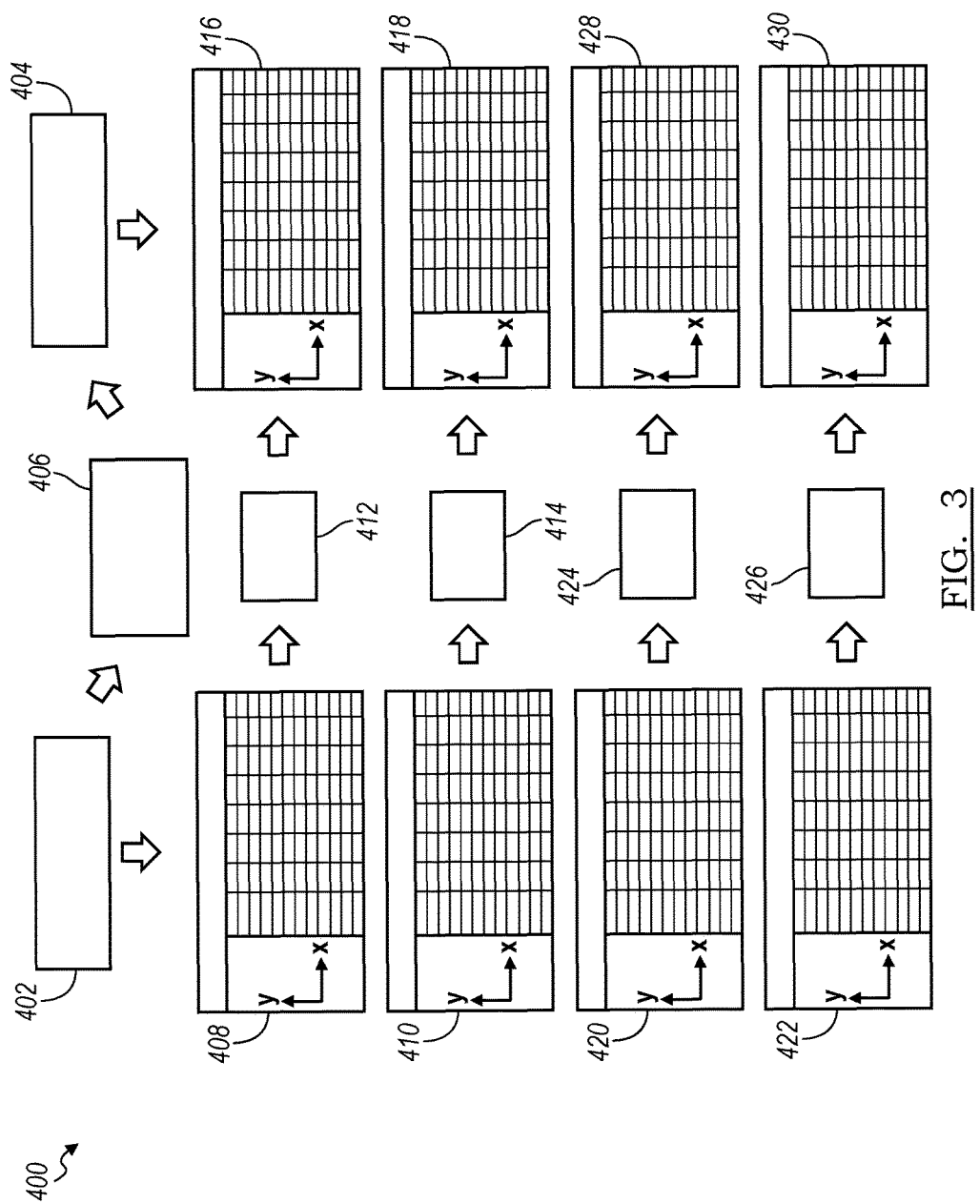
FIG. 3 is a functional block diagram illustrating process steps of employing lookup tables for controlling cam shaft phase for optimal cabin heating.

In various implementations, the actuator constraint module 360 adjusts the actuator limits or constraints for a given actuator to follow a predetermined schedule that is dependent on operation conditions of the engine 102 such as speed, load and ambient conditions. Specifically, the actuator constraint module 360 adjusts the actuator constraints for the intake cam phaser 148 and the exhaust cam phaser 150 to follow a predetermined schedule that is dependent on engine speed, load and ambient conditions to constrain the amount of dilution in the combustion system or to maintain the combustion quality and thus performance of the engine 102 at an acceptable level. Accordingly, in the particular implementations shown in FIG. 2, the constraint module 360 receives the cabin heating request 367 and employs this information with the lookup tables 408, 410, 420, 422, 416, 418, 428 and 430 of a process 400 illustrated in FIG. 3 to generate the minimum and maximum actuator constraints for both the intake cam phaser 148 and the exhaust cam phaser 150 for optimal cabin heating. Note that It should be understood, that cabin heating encompasses windshield defrost functions of the vehicle HVAC system as well.

Turning again to FIG. 3, the process 400 presents the steps of controlling the phase of the intake and exhaust cam phasers 148 and 150 when cabin heating is requested. Specifically, a cabin heating request 402 is made corresponding to the cabin heating request 367 in FIG. 2, and the request 402 is utilized in one or more lookup tables such as an intake phaser minimum constraint lookup table 408, an intake phaser maximum constraint lookup table 410, an exhaust phaser minimum constraint lookup table 420, and an exhaust phaser maximum constraint lookup table 422. In particular implementations, the lookup tables 408, 410, 420 and 422 are two dimensional tables that represent, for example, the engine speed on the (X) axis and the engine load on the (Y) axis. Accordingly, the lookup table 408 and 410 contain experimental and empirical values that, based on the current values of the two variables, provide specific, predetermined target constraints for the intake cam phaser 148, while the lookup tables 420 and 422 contain the values that provide specific, predetermined target constraints for the exhaust cam phaser 150 when a cabin heating request is made.

After the initial request for the cabin heating, the process 400 transitions to a normal mode of operation as indicated by the sequence of steps 406 and 404. During this transition, a filter 412 is applied to the values of intake phaser minimum constraint lookup table 408, a filter 414 is applied to the values of the intake phaser maximum constraint lookup table 410, a filter 424 is applied to the values of the exhaust phaser minimum constraint lookup table 420, and a filter 426 is applied to the values of the exhaust phaser maximum constraint lookup table 422. In essence, the filters 412, 414, 424 and 426 moderate or slow the transition from the cabin heating mode to the normal mode of operation for the intake cam phaser 148 and the exhaust cam phaser 150 as determined by the phaser actuator module 158.

In the normal mode of operation, a normal intake phaser minimum constraint lookup table 416, a normal intake phaser maximum constraint lookup table 418, a normal exhaust phaser minimum constraint lookup table 428, and a normal exhaust phaser maximum constraint lookup table 430 are employed. The lookup tables 416, 418, 428 and 430 are also two dimensional lookup tables similar to the lookup tables 408, 410, 420 and 422 that contain experimental and empirical values that, based on the current values of the two variables. Accordingly, the lookup tables 416 and 418 contain the values that provide specific, predetermined target constraints for the intake cam phaser 148, while the lookup tables 428 and 430 contain the values that provide specific, predetermined target constraints for the exhaust cam phaser 150 after the process 400 has transitioned from the cabin heating mode of operation 402 to the normal mode of operation 404.

Note that the utilization of the actuator constraint module 360 with the cabin heating request 367 can be employed in other modules as well. For example, the constraint values 348 based on the cabin heating request 367 can be utilized in the boost actuator module 164 to control the boost of the turbocharger by controlling opening of the wastegate 162 to achieve a target waste gate opening area. In other implementations, the cabin heating based constraint values 348 are employed in the throttle actuator module 116 to adjust the opening of the throttle valve 112 to achieve the target throttle opening area. Alternatively, the cabin based constraint values 348 can be employed in the EGR actuator module 172 to achieve a target EGR opening area with the EGR valve 170. Accordingly, the constraint values 348 based on the cabin heating request 367 can be utilized in any of the boost actuator module 164, the throttle actuator module 116, the EGR actuator module 172 or the phase actuator module 158 individually or in any combination of the modules.

In this application, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of controlling intake and exhaust cam phase in an internal combustion engine for optimal HVAC performance in a motor vehicle, the method comprising:
   requesting a cabin heating value;
   sensing an engine speed and an engine load of the internal combustion engine;
   utilizing the cabin heating value, the engine speed and the engine load in one or more lookup tables to determine intake phaser constraint values and exhaust phaser constraint values for cabin heating; and
   transitioning the intake phaser constraint values and the exhaust phaser constraint values for cabin heating to intake phaser constraint values and exhaust phaser constraint values based on one or more lookup tables for normal operation without a cabin heating request.

2. The method of claim 1 wherein the lookup tables are two dimensional lookup tables.

3. The method of claim 1 wherein the one or more lookup tables for cabin heating are four lookup tables.

4. The method of claim 3 wherein the one or more lookup tables for normal operation are four lookup tables.

5. The method of claim 4 wherein the four lookup tables for cabin heating include an intake phaser minimum constraint lookup table, an intake phaser maximum constraint lookup table, an exhaust phaser minimum constraint lookup table, and an exhaust phaser maximum constraint lookup table, and wherein the four lookup tables for normal operation include an intake phaser minimum constraint lookup table, an intake phaser maximum constraint lookup table, an exhaust phaser minimum constraint lookup table, and an exhaust phaser maximum constraint lookup table for normal operation without cabin heating.

6. The method of claim 1 further comprising utilizing one or more lookup tables for a boost actuator module to control the boost of a turbocharger by controlling an opening of a waste gate to achieve a target waste gate opening area during a cabin heating operation.

7. The method of claim 1 further comprising utilizing one or more lookup tables for an EGR actuator module to achieve a target EGR opening area with an EGR valve during a cabin heating operation.

8. The method of claim 1 further comprising utilizing one or more lookup tables for a throttle actuator module to adjust an opening of a throttle valve to achieve a target throttle opening area during a cabin heating operation.

9. The method of claim 1 further comprising applying one or more filters to the transitioning to moderate the transition from cabin heating operation to the normal operation.

10. A method of optimizing HVAC performance in an internal combustion engine for a motor vehicle, the method comprising:
    requesting a cabin heating value;
    sensing an engine speed and an engine load of the internal combustion engine; and
    utilizing the cabin heating value, the engine speed and the engine load in one or more lookup tables for at least one of the following: a phaser actuator module that controls an intake cam phaser and an exhaust cam phaser, a boost actuator module that controls the boost of a turbocharger by controlling an opening of a wastegate to achieve a target waste gate opening area, an EGR actuator module that achieves a target EGR opening area with an EGR valve, and a throttle actuator module that adjusts an opening of a throttle valve to achieve a target throttle opening area.

11. The method of claim 10 wherein controlling the intake cam phaser and the exhaust cam phaser includes determining intake phaser constraint values and exhaust phaser constraint values for cabin heating.

12. The method of claim 11 further comprising transitioning the intake phaser constraint values and the exhaust phaser constraint values for cabin heating to intake phaser constraint values and exhaust phaser constraint values based on one or more lookup tables for normal operation without a cabin heating request.

13. The method of claim 12 wherein the one or more lookup tables are two dimensional lookup tables.

14. The method of claim 12 wherein the one or more lookup tables for the phaser actuator module for cabin heating are four lookup tables.

15. The method of claim 14 wherein the four lookup tables for cabin heating include an intake phaser minimum constraint lookup table, an intake phaser maximum constraint lookup table, an exhaust phaser minimum constraint lookup table, and an exhaust phaser maximum constraint lookup table for cabin heating mode.

16. The method of claim 12 wherein the one or more lookup tables for normal operation are four lookup tables.

17. The method of claim 16 wherein the four lookup tables for normal operation include an intake phaser minimum constraint lookup table, an intake phaser maximum constraint lookup table, an exhaust phaser minimum constraint lookup table, and an exhaust phaser maximum constraint lookup table for normal operation.

18. The method of claim 12 further comprising applying one or more filters to the transitioning to moderate the transition from cabin heating operation to the normal operation.

19. A method of controlling intake and exhaust cam phase in an internal combustion engine for optimal HVAC performance in a motor vehicle, the method comprising:
   requesting a cabin heating value;
   sensing an engine speed and an engine load of the internal combustion engine;
   utilizing the cabin heating value, the engine speed and the engine load in four lookup tables to determine intake phaser constraint values and exhaust phaser constraint values for cabin heating, the four lookup tables for cabin heating including an intake phaser minimum constraint lookup table, an intake phaser maximum constraint lookup table, an exhaust phaser minimum constraint lookup table, and an exhaust phaser maximum constraint lookup table for cabin heating; and
   transitioning the intake phaser constraint values and the exhaust phaser constraint values for cabin heating to intake phaser constraint values and exhaust phaser constraint values based on four lookup tables for normal operation without a cabin heating request, the four lookup tables for normal operation including an intake phaser minimum constraint lookup table, an intake phaser maximum constraint lookup table, an exhaust phaser minimum constraint lookup table, and an exhaust phaser maximum constraint lookup table for normal operation.

* * * * *